United States Patent [19]

Lichti et al.

[11] 4,282,953
[45] Aug. 11, 1981

[54] EMERGENCY OVERSPEED BRAKE

[75] Inventors: R. D. Lichti, Lakewood; Howard Reimel, Rancho Palos Verdes, both of Calif.

[73] Assignee: Park Mobile, Inc., New York, N.Y.; by said Howard Reimel

[21] Appl. No.: 16,820

[22] Filed: Mar. 2, 1979

[51] Int. Cl.³ ............................................. B60T 7/12
[52] U.S. Cl. ................................................. 188/189
[58] Field of Search ................ 188/189, 184, 185, 186, 188/187, 82.2, 82.77, 71.1, 73.2

[56] References Cited

U.S. PATENT DOCUMENTS

| | | | |
|---|---|---|---|
| 3,415,343 | 12/1968 | Svensson | 188/185 X |
| 3,576,242 | 4/1971 | Mumma | 188/185 X |
| 3,695,399 | 10/1972 | Laing | 188/187 |
| 3,729,071 | 4/1973 | Laing et al. | 188/189 |
| 3,768,609 | 10/1973 | Laing | 188/184 |
| 3,934,682 | 1/1976 | Hedstrom | 188/189 X |
| 4,015,696 | 4/1977 | Lichti | 188/189 |

*Primary Examiner*—Douglas C. Butler
*Attorney, Agent, or Firm*—Larson, Taylor & Hinds

[57] ABSTRACT

An emergency overspeed brake is depicted which is mountable onto a shaft rotatable at low speeds in either direction for stopping the shaft when an overspeed condition is obtained. In one embodiment of the invention, the brake features two pawls mounted for movement of the entire pawl in an outward, radial direction in response to centrifugal force acting on said pawl. An annular outer hub rigidly mounted to a stationary frame has a central orifice through which the shaft extends. Two inwardly depending stops are integrally mounted onto an axial flange of the outer hub and engaged by one end of a corresponding pawl when the pawl has been thrown outwardly due to the centrifugal force. A spring member engages each pawl to prevent the outward movement of the pawl until after a predetermined speed has been attained, after which the pawls are thrust rapidly outwardly. The brake also comprises an inner hub rigidly mounted to the shaft, an annular drive plate onto which the pawls are mounted, at least two lugs rigidly attached to the drive plate for engaging one end of corresponding pawls, and a disc brake assembly operatively connecting the outer drive plate and the inner hub. Finally, two symmetric cam surfaces located on the internal side of the flange of the inner hub permit only the leading edge of the pawl to be extended completely outwardly in response to the centrifugal force.

29 Claims, 10 Drawing Figures

EMERGENCY OVERSPEED BRAKE

FIELD OF THE INVENTION

The present invention relates to a safety device and in particular to an emergency overspeed brake for a rotary shaft. Particularly, with respect to one embodiment, the present invention relates to a bi-directional shaft braking device operable at relatively low shaft rotational speeds.

BACKGROUND OF THE INVENTION

Overspeed braking devices for shafts are relatively well known. These devices usually include a pawl which rotates with the shaft and can travel outwardly as a result of centrifugal force to engage a stationary lug at a predetermined overspeed and thereby brake the shaft's rotation. Overspeed safety brakes of this type are generally used for stopping shafts that rotate at relatively low speeds on the order of about 200 rpm and find application, for example, in lifts, hoists, loading bridges for aircraft, elevators, and turrets. Obviously, however, there are other applications which would be obvious to those of ordinary skill in the art and the foregoing list is only exemplary. Some prior art overspeed braking devices are disclosed in U.S. Pat. Nos. 4,015,696 to Lichti (one of the present inventors); 3,934,682 to Hedstrom; 3,768,609 and 3,695,399 to Laing; 3,729,071 to Laing et al; 3,576,242 to Mumma; and 3,415,343 to Svensson.

In most of the foregoing brake mechanisms, a rotating pawl is continuously pivoted outwardly by centrifugal force against an opposing resilient force from a spring until the pawl is moved far enough radially outwardly such that it engages a stationary stop. Thus, the shape of the pawl, its weight, and the attaching spring are very critical in order for the device to actuate at the proper speed. In all of the devices in which the shaft is stopped upon engagement of the pawl with a stationary stop, the stopping torque is transmitted through the pawl and to the shaft which the pawl is journalled and rotates and from the shaft to some type of braking mechanism. This arrangement provides a large, undesirable shearing force on the pawl shaft. In addition, this common pawl system does not function well at very low speeds (under 200 rpm) because the entire pawl is not free to travel outwardly, but instead is constrained to pivot about an arc. Other disadvantages of many of the prior art overspeed braking devices used to stop large shafts include their relatively large size, complexity, and inaccuracy. Furthermore, many of these devices require disassembly of the system for resetting once the brake has been engaged.

SUMMARY OF THE INVENTION

An emergency overspeed brake assembly according to the present invention provides a relatively simple, inexpensive, positive actuating centrifugal braking device for a rotary shaft. A brake according to the present invention is operable at low shaft rotational speeds in either direction of shaft rotation. Although the present invention utilizes outwardly moving pawls, the pawls are not constrained to a pivotal motion and the entire pawl is free to move straight radially outwardly so as to maximize the sensitivity of the pawl to the relatively small centrifugal force at the lower rotation speeds. In addition, the braking force is transmitted through only solid surfaces from a stationary lug through the entire pawl to a lug rotating with the pawl so that the load path is solid and does not encompass any bearings or rotating shafts. Furthermore, the present invention provides a brake with a balanced load handling capability where the stopping force is applied symmetrically to brake and stop a central rotating shaft. This feature eliminates any strain on the central shaft's bearings. In a further aspect of the present invention, the pawl does not move at all under the influence of centrifugal force until a certain, predetermined force is reached, at which time the pawl snaps outwardly to an extended position where it can engage a stationary lug. In a still further aspect of one embodiment of the present invention, the brake can be reset without disassembly of the brake or manipulation of the brake other than by normal operation of the main shaft on which the brake is mounted.

A brake according to the present invention has a short response time for braking action and once the critical, predetermined shaft angular velocity has been reached, the pawls of the braking device rapidly travel radially outwardly.

In accordance with one embodiment of the invention, a dual action overspeed safety brake for a shaft rotatable in either direction is provided and comprises a stationary mountable annular member having a central bore through which the shaft can extend and a peripheral, axially extending flange, a stop means integral with the flange providing two contact surfaces for each direction of shaft rotation, an elongate pawl rotatable when the shaft is rotating, restraining means for preventing the trailing end of the pawl from travelling completely radially outwardly in response to centrifugal force, and mounting means for mounting the pawl so as to permit outward radial movement of the pawl's leading end in response to centrifugal force. A brake means is operatively connected to the shaft for the braking thereof and there is a transmitting means coupled to the brake means for transmitting the braking force from the engagement of the pawl with the stop means.

In another embodiment of the present invention, an overspeed safety brake for a shaft rotatable relative to a stationary base comprises a member mountable on the stationary base in proximity of the shaft, at least one stop integrally mounted to a portion of said member and extending radially inwardly toward the shaft, and a hub integrally mountable on the shaft axially spaced from said member for rotation with the shaft. At least one lug is generally rotatable with the shaft and is spaced radially therefrom, extending axially to an overlapping relationship therewith. The means operatively connects the lug to the hub and at least one pawl is angularly spaced from the lug. A pawl mounting means mounts the pawl for radial movement of at least one end thereof in response to centrifugal force such that the lug is interposed between the stop and the lug for stopping engagement therewith at a predetermined shaft angular velocity. As a result of the innerposition of the lug between the stop and the lug, the hub and hence the shaft are stopped with a stopping force that is transmitted directly through the pawl and not through a mounting shaft of the pawl.

In a further embodiment of the present invention, an overspeed safety brake for a rotary shaft comprises a stop mountable in proximity of the shaft and extending radially inwardly toward the shaft, a hub integrally mountable on the shaft for rotation therewith and axially spaced from the stop, at least one pawl, and first and second mounting means for the pawl such that at least one end of the pawl can move radially outwardly in response to centrifugal force and such that the end can engage the stop and transmit the stopping force to the hub and hence to the shaft. Contrary to the pawls disclosed in the aforementioned prior art whereby the pawl moves continuously outwardly, the present invention pursuant to this embodiment further includes means for preventing any outward radial movement of the pawl until a predetermined shaft rotational speed is obtained and then for releasing the pawl. This feature provides the present invention with the ability to accurately control the rotational speed at which the pawl can engage the stop. In addition, accidental engagement or release of the pawl can be positively prevented.

In the operation of one embodiment of the invention, when the critical speed is reached, the two pawls break away from their respective holding members and fly outwardly until the trailing ends engage the corresponding cam surfaces. The leading end of each pawl continues to travel outwardly until it engages the corresponding side of the corresponding stop whereupon the two pawls are interposed between the corresponding stops and lugs mounted on the outer drive. The stopping force is transmitted through the outer drive plate, through the brake assembly to the inner hub, and then to the shaft, thereby stopping the shaft.

Other features, details, and objects of the present invention will be set forth in, or apparent from, the accompanying drawings and the detailed description of the preferred embodiments found hereinbelow.

BRIEF DESCRIPTION OF THE DRAWINGS

FIG. 3 is an exploded perspective view taken from a scaled blueprint of a second and presently preferred embodiment of the present invention and FIG. 3a is a plan view thereof.

DETAILED DESCRIPTION OF THE PRESENTLY PREFERRED EMBODIMENTS

Figure 1:
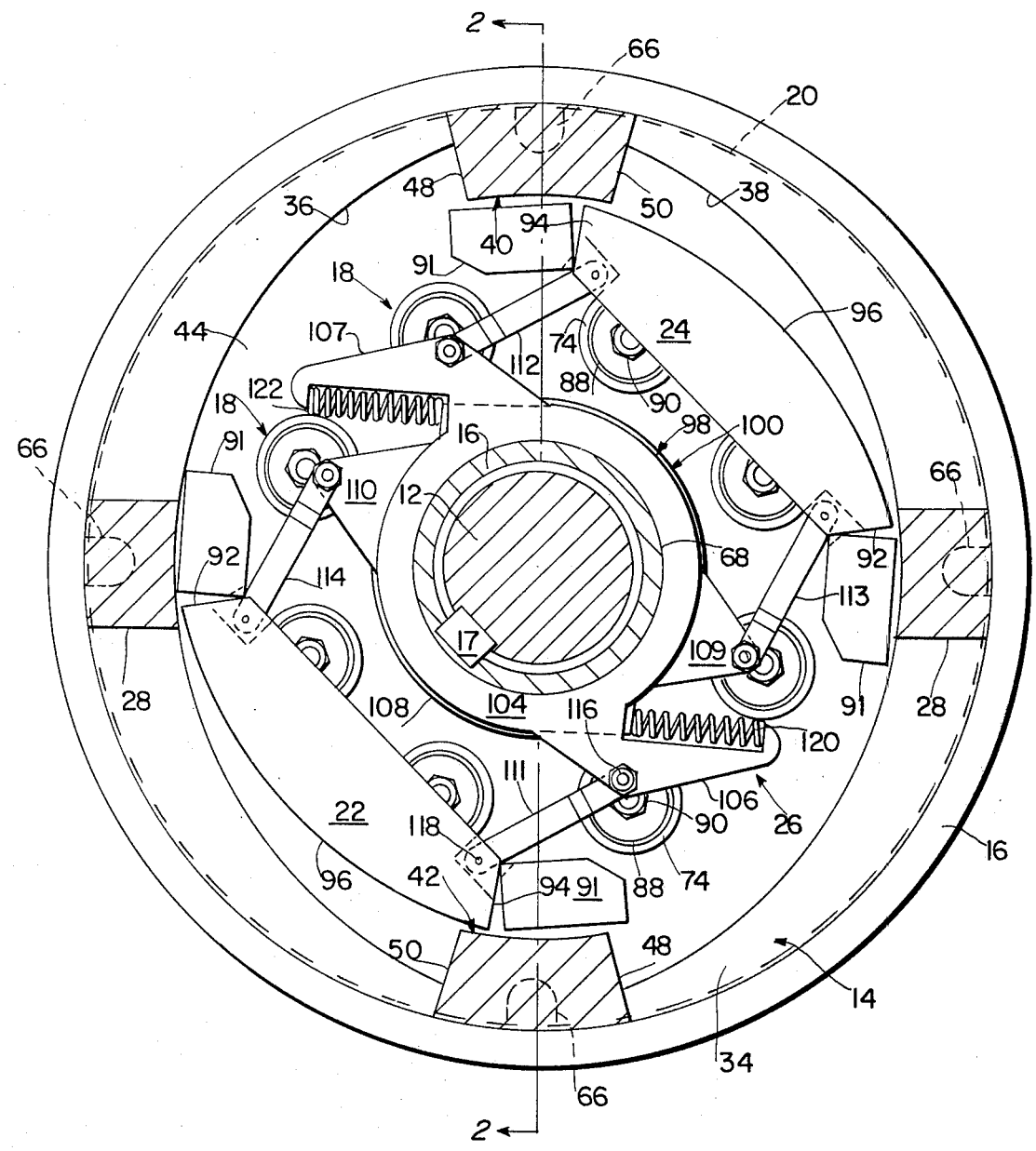
FIG. 1 is a generally scaled plan view, partly in cross-section along line 1—1 of FIG. 2, taken from a blueprint of a dual action, overspeed safety brake operable in either direction of shaft rotation according to a first embodiment of the present invention.

With reference now to the figures wherein like elements have like numerals throughout the several views and different embodiments of the invention, a plurality of embodiments of an overspeed safety brake for a relatively large and a relatively slowly rotating shaft are depicted. With particular reference to FIG. 1, a dual action, overspeed safety brake 10 is shown mounted on a rotatable shaft 12 that is normally rotatable in either direction. Brake 10 comprises a substantially stationary, annular member or hub 14 that is mountable on a stationary base (not shown), an annular rotatable hub 16 which is keyed to shaft 12 with a key 17 for rotation therewith, a brake means 18 coupled to rotatable hub 16, and an outer drive plate 20 which is coupled to brake means 18 for transmitting a braking force between stationary hub 14 and rotatable hub 16 and hence between a stationary base and shaft 12. Brake 10 further comprises two elongate pawls 22 and 24 mounted for rotation with shaft 12 by a mounting means, generally shown at 26, which also permits outward radial movement of pawls 22 and 24 in response to centrifugal force.

Figure 2:
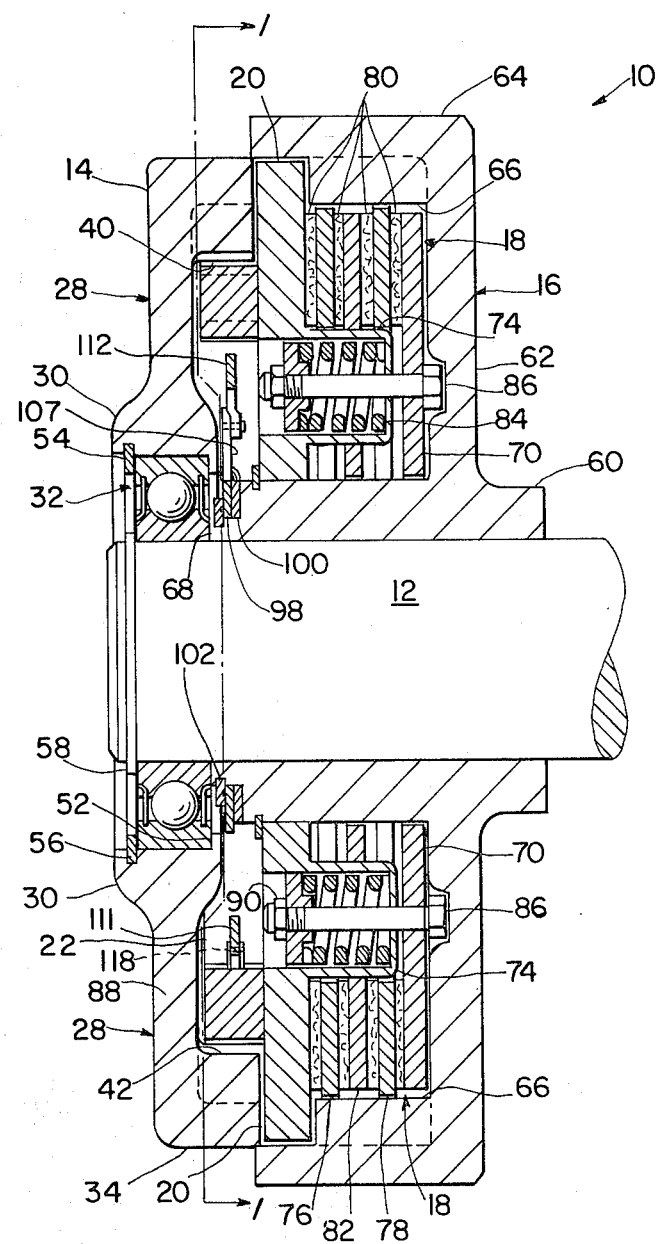
FIG. 2 is a cross-sectional view taken along line 2—2 in FIG. 1.

Stationary hub 14 is generally comprised of a metal casted, annular disc having four radial arms 28 which extend between an enlarged inner annular portion 30 for supporting a bearing 32 and an outer flange 34. Flange 34, in turn, is comprised of two opposed, spaced-apart, cresent-shaped cams 36 and 38 and two, bi-directional stops 40 and 42 integrally connected to corresponding ends of cams 36 and 38. As can best be seen in FIG. 1, flange 34 defines an inner generally oval-shaped opening 44 with stops 40 and 42 located at the corresponding ends and extending downwardly therein. As also seen in FIG. 1, stops 40 and 42 in cross-section are truncated triangles having an altitude that is less than the radial distance to the center of flange 34. For the purposes of convention only, stops 40 and 42 as viewed in FIG. 1 will be considered as having a leading side 48 and a trailing side 50 in clockwise direction of rotation, which can be considered to be the positive direction of rotation. Thus, because of the truncated triangular shape of stops 40 and 42, leading and trailing sides 48 and 50 form acute angles with the ends of cams 36 and 38. Stationary hub 14 in addition, can be provided with mounting means (not shown with respect to the embodiment of the invention depicted in FIGS. 1 and 2) for rigidly mounting stationary hub 14 to a support member or a frame member. In this way, bearing 32 provides a means for rotatably mounting the end of shaft 12 to the frame member or support member. As can be seen in FIG. 2, bearing 32 is a roller bearing which is mounted concentrically inside an annular opening defined by the inner ends of thickened inner portion 30 of arms 28. Bearing 32 is retained in place by an annular lip 52 which is integral with thickened inner portion 30 on the rearward side thereof and by a retaining ring 54 which fits inside a groove 56 in the forward position thereof. A second retaining ring 58 is mounted on the end of shaft 12 and retains the radially inward portion of bearing 32 in place.

With particular reference to FIG. 2, rotatable hub 16 is comprised of a cast metal, cup-shaped annular disc having an inner sleeve 60 with a central orifice therein for receiving shaft 12, a radially extending disc 52 and an annular flange member 64 connected to the outer circumference of disc 62. The inner radius of flange member 64 is selected to be slightly greater than the outer radius of stationary hub flange 34 such that there is a close fitting arrangement therebetween so to prevent foreign matter from entering the inside of brake 10. Four radially, inwardly depending disc stops 66 are connected to and integral with the surface of flange member 64 at each quadrant thereof (as shown in FIG. 1). The forward end portion 68 of sleeve 60 as shown in FIG. 2 has a reduced radial thickness for receiving pawl mounting means 26 and the axial end thereof abuts the inner, rearward portion of bearing 32. As mentioned above, rotatable hub 16 is rigidly mountable to shaft 12 with means such as key 17.

With particular reference to FIG. 2, brake means 18 is depicted in greater detail. Brake means 18 is a multi-disc, constantly loaded brake that is comprised of a rearwardly located, lower drive plate 70, the aforementioned outer or upper drive plate 20 which has a plurality of axially extending cups 74 located equi-distant from the center of upper drive plate 72 (which number eight in the depicted embodiment) and a forward and rearward brake disc 76 and 78, respectively, having conventional brake linings 80 mounted on each face thereof. Both discs 76 and 68 have four notches in the circumference thereof at each quadrant for receiving disc stops 66. Thus, disc stops 66 prevent the relative rotation of brake disc 76 and 78 with respect to rotatable hub 16. Brake discs 76 and 78 sandwich a disc drive plate 82 which has a smaller diameter than brake discs 76 and 78 so that it can rotate relative thereto.

The constant loading of brake means 18 is obtained by compressive force between upper drive plate 20 and lower drive plate 70 created by the plurality of brake springs 84, each brake spring being mounted in a corresponding cup 74 in upper drive plate 20. Each spring is mounted and precompressed by means such as a bolt 86 which extends through lower drive plate 70 and a brake spring retaining plate 88 mounted on bolt 86 by a nut 90. It should thus be obvious that the loading of brake means 18 is simply obtained by adjustment of nuts 90 to vary the compression of the corresponding brake springs 84.

A constantly loaded brake means 18 permits a limited relative rotation between upper drive plate 20 and lower drive plate 70 when the rotation of the former is suddenly stopped and thus provides a cushioned stopping force for shaft 12 rigidly attached to the latter. Rigidly mounted onto the face of upper drive plate 20 and spaced 90 degrees apart and equidistant from shaft 12 are four axially extending lugs 91 for receiving the brake means stopping force and for transferring the force to upper drive plate 20. Lugs 91 can be rigidly mounted to drive plate 20 for example by being integrally cast therewith or by being welded thereto. As can be seen in FIG. 1, lugs 91 are radially spaced from shaft 12 so as to be proximate to, but closely spaced apart from the most inwardly extending part of the center portion of cams 36 and 38. As can be best seen in FIG. 2, lugs 91 also overlap flange 34 of stationary hub 14. The trailing ends of lugs 91 are oriented with respect to the center portion of cams 36 and 38 so as to form an acute angle therewith.

Pawls 22 and 24 and pawl mounting means 26 can best be seen in FIG. 1. Pursuant to the convention adopted with respect to FIG. 1, pawls 22 and 24 have a leading end 92 and a trailing end 94 when rotated in the clockwise direction as viewed in FIG. 1. Pawls 22 and 24 have an arcuate outer side 96 which has a shape that generally conforms to the arcuate shape of cams 36 and 38 beginning at their respective juncture with stops 48 and 50. Leading and trailing ends 92 and 94 of the pawls conform to the acute angles formed at the ends of cams 36 and 38 and described hereinabove. Thus, when pawls 24 and 26 move radially outwardly in response to centrifugal force to an abutting position with cams 36 and 38 and stops 40 and 42, the contacting sides of pawls 22 and 24 evenly and smoothly mate with the corresponding contacting surfaces of stops 40 and 42 and cams 36 and 38. On the other hand, the leading ends 92 of pawls 22 and 24 form an acute angle with the outer circumference so as to conform with the angle formed between the trailing end of lug 91 and cam 36 or 38 when pawls 22 and 24 are in contact therewith. Hence, upon engagement of a pawl with a corresponding cam, a solid load bearing path is formed between stop 40 or 42 with the corresponding lug 91. By this design of overspeed brake 10, the load bearing path does not extend through any axial shafts, (e.g., pin 76 in the Lichti U.S. Pat. No. 4,015,696) or journal supports (such as journals 16 in Svensson U.S. Pat. No. 3,415,343 or pivot pins 78 in the Laing U.S. Pat. No. 3,695,399). Pawl mounting means 26 permits outward radial movement of leading pawl end 92 in response to centrifugal force such that it engages leading stop side 48 and also permits the corresponding cam 36 or 38 to prevent the complete outward radial movement of trailing pawl end 94.

In the embodiment of overspeed brake 10 depicted in FIGS. 1 and 2, pawl mounting means 26 comprises a forward mounting ring 98 and a rearward mounting ring 100 concentrically mounted on forward end portion 68 of sleeve 60 for rotation therewith. A retaining ring 102 concentrically mounted in forward end portion 68 forward of mounting rings 98 and 100 prevents forward movement thereof. Forward mounting ring 98 is comprised of an annular ring member 104 and first and second yokes 106 and 107 integral with ring member 104 and mounted on opposite sides thereof. Rearward mounting ring 100 is similarly comprised of an annular ring member 108 and first and second yokes 109 and 110 integral with and connected at opposite sides of ring member 108. Four connecting links, first, second, third and fourth connecting links 111, 112, 113, and 114, respectively, interconnect forward and rearward mounting rings 98 and 100 with pawls 22 and 24, each connecting link being pivotably mounted at each end thereof to either a connecting link or a pawl. Each connecting link is a rigid, z-shaped metal member. The connecting links are pivotably attached to the corresponding mounting ring with means such as a screw and nut combination 116 and are pivotably connected at the other end thereof to the pawl with means such as a pin 118 as follows. First connecting link 111 is connected at one end to first yoke 106 and is connected at the other end to trailing end 94 of pawl 22. Second connecting link 112 is connected at one end to second yoke 107 of forward mounting ring 98 and connected at the other end to the trailing end 94 of pawl 24. Third connecting link 113 is connected at one end to first yoke 109 of rearward mounting ring 100 and connected at the other end to leading end 92 of pawl 24. Finally, a fourth connecting link 114 is connected at one end to second yoke 110 of rearward mounting ring 100 and connected at the other end to the leading end 92 of pawl 22.

In order to ensure that brake 10 operates in a positive, predictable manner at a predetermined, adjustable rotational speed, brake 10 further includes a means for preventing any outwardly radial movement of pawls 22 and 24 until a predetermined shaft rotational speed is obtained and then at that speed for releasing pawls 22 and 24. In the embodiment of the invention depicted in FIGS. 1 and 2, the preventing means comprises two compression springs 120 and 122 mounted on two spring guides (not shown) which in turn are respectively mounted between first yoke 106 of forward mounting ring 98 and first yoke 109 of rearward mounting ring 100 and between second yoke 107 of forward mounting ring 98 and second yoke 110 of rearward mounting ring 100. Thus, it can be seen that when pawls 22 and 24 are forced outwardly in response to centrifugal force, springs 120 and 122 are compressed as a result of the relative rotation between forward and rearward mounting rings 98 and 100. However, at a certain point, an "over-the-center" rotational position of mounting rings 98 and 100 will be reached whereupon the compression of springs 120 and 122 will be a maximum and further rotation of mounting rings 98 and 100 will permit expansion of the compressed springs 120 and 122. At this point, pawls 22 and 24 are suddenly thrust outwardly in response to the centrifugal force now aided by the expansion force of springs 120 and 122. Adjustment of the "trip point" at which pawls 22 and 24 are thrust outwardly can be adjusted by either changing the type of spring used or by adding a certain amount of precompression to springs 120 and 122 by means (not shown) such as a screw and nut assembly.

In normal operation, brake 10 has been mounted on the end of a rotating shaft rotatable in either the forward or rearward direction, such as the shaft of an elevator. Normal rotational speed of shaft 12 in either direction can be approximately 62 to 70 rpm. However, should the elevator operating mechanism malfunction or should the normal elevator holding means fail causing the elevator car to drop out of control, the rotational speed of shaft 12 will increase. In a preferred embodiment, brake 10 will have a trip point of approximately 100 rpm. At that speed, both yokes 106 and 107 of forward mounting ring 104 and both yokes 109 and 110 of rearward mounting ring 108 will have been rotated in the clockwise and counterclockwise directions, respectively (assuming shaft 12 is turning in the clockwise direction), as a result of pawls 22 and 24 being forced outwardly in response to the centrifugal force. Leading edge 92 of pawls 22 and 24 will be permitted to extend outwardly further than trailing ends 94 thereof because of the camming action of cams 36 and 38. The outward movement of pawls 22 and 24 will be coordinated and adjusted for any possible inbalance of the components of brake 12 through the equalizing actions of connecting links 111, 112, 113 and 114, and mounting rings 98 and 100. At the trip point, compression springs 120 and 122 will have reached their maximum compression as yokes 106 and 109, on the one hand, and yokes 107 and 110, on the other hand, will have been rotated in opposite directions. Then, at the trip point, the compression of springs 120 and 122 will now aid the further counter rotations of forward and rearward mounting rings 98 and 100 which will force yokes 22 and 24 through connecting links 111 through 114 to snap outwardly. As mentioned above, only the leading ends 92 of pawls 22 and 24 will be permitted to extend outwardly in the maximum radial direction at which point these leading ends 92 will contact leading side 48 of stops 40 and 42. As soon as this contact is made, upper drive plate 20 which has been rotating with lower drive plate 70 as a result of the frictional connection through brake means 18 stops rotating when the trailing ends of the corresponding lugs 91 comes in contact with the leading ends 92 of lugs 22 and 24. As mentioned above, this stopping force is then transferred to upper drive plate 20 through brake means 18 to lower drive plate 70 and thence to shaft 12.

Once overspeed brake 10 has been activated and shaft 12 has been stopped, brake 10 can be easily reset simply by rotating shaft 12 in the opposite direction. It should be obvious that when so rotated, the leading ends 92 of pawls 22 and 24 are restricted as a result of the camming action with corresponding cams 36 and 38. As shaft 12 is rotated in the opposite direction, springs 120 are compressed until the over the center position has again been reached. Thereafter the subsequent expansion of springs 120 will result in forcing mounting rings 98 and 100 to rotate in opposite directions such that first yokes 106 and 109 and second yokes 107 and 110 are rotated towards each other, which in turn pulls pawls 22 and 24 inwardly and completes the re-setting of overspeed brake 10.

Obviously, the operation of overspeed brake 10 is the same if shaft 12 were rotating in the counter-clockwise direction and were being re-set by rotating shaft 12 in the clockwise direction because of the symmetrical shape and arrangement of the aforedescribed components of brake 10.

Figure 3:
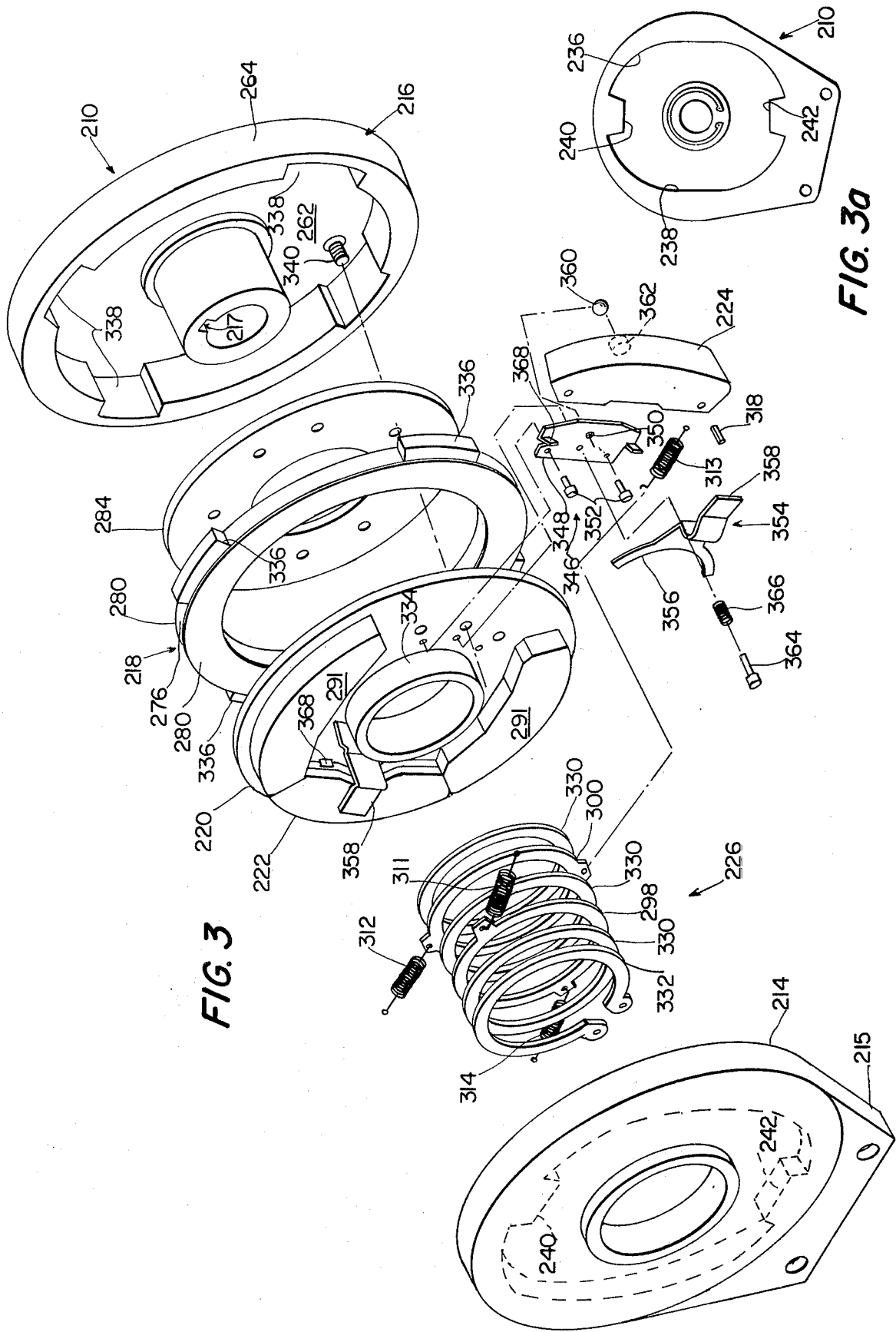

Referring now to FIG. 3, there is depicted an emergency overspeed brake 10 according to a second embodiment of the present invention. For ease in comparing this embodiment of the invention with other embodiments of the invention, a numbering convention has been adopted in which the same last two digits are used for most components which are the same or similar in the different embodiments.

Brake 210 comprises a stationary hub 214 having a flange 215 for mounting to a frame member, a rotatable hub 216 rigidly mountable onto a shaft (not shown) by means of a key and keyway 217, a brake assembly 218 and an outer drive plate 220. Brake 210 further comprises pawls 222 and 224 and a mounting assembly 226 for mounting pawls 222 and 224 for outward radial movement on outer drive plate 220.

Mounting assembly 226 comprises two annular mounting rings, a forward mounting ring 298 and a rearward mounting ring 300 spaced between three washers 330 to permit relative rotation thereof, a snap ring 332 for mounting the pawl mounting assembly 226 onto a central annular sleeve 334 integral with outer drive plate 220 and four connecting link springs 311, 312, 313 and 314. Connecting link springs are used in the brake embodiment depicted in FIG. 3 instead of solid metal members as used in FIG. 1 so that the movement of pawls 222 and 224 can be coordinated on the one hand, but so that the operation of one pawl will not be prevented should the other pawl fail to engage. Thus, the connecting link springs act as helical tension springs and will also permit a more resilient operation of pawls 222 and 224 and provide a re-setting force to aid in re-setting brake 210.

Brake means 218 is similar to brake means 18 except that only a single brake disc 276 is utilized and the plurality of brake springs 84 for constantly loading brake means 18 have been replaced with a single disc spring 284 of the Belleville spring type. The outer circumferential edge of disc spring 284 abuts against a brake lining 280 attached to brake disc 276 and the inner, rearwardly disposed circumferential edge of disc spring 284 abuts against the inner portion of inner hub disc 262. Brake disc 276 is prevented from rotating relative to rotatable inner hub 216 by means of four circumferential lugs 336 on brake discs 276 engaging four corresponding keyways 338 in flange member 264 of inner hub 216. Disc spring 284 on the other hand, is prevented from relative rotation with inner hub 216 by eight screws 340 (only one of which is shown) mounted on inner hub disc 262 and extending through corresponding orifices 342 in spring 284. Outer drive plate 220 is similarly mounted against rotational movement to inner hub 216 by means of screws 340 also extending through orifices therein.

The use of a Belleville spring for constantly loading brake means 218 permits the application of relatively large compression forces in a very small axial distance. Brake 210 also differs from brake 10 by using a ball-detent preventing means 346 for preventing the outward radial movement of pawls 222 and 224 until a predetermined, preselectable rotational speed has been achieved. Preventing means 346 comprises a stop plate 348 having a orifice 350 therein and rigidly mounted to outer drive plate 220 with means such as screws 352, a pawl retention arm 354 having an arcuately shaped, concave base 356 for engaging sleeve 334 of outer drive plate 220 and an integral outwardly extending leaf spring member 358, and a spherical ball 360 mounted between stop plate orifice 350 and a depression 362 in the underside of the corresponding pawl 222 or 224. Leaf spring member 358 engages the top surface of the corresponding pawl 222 or 224 and is mounted to outer drive plate 220 with an adjustable amount of impression by a screw 364 and a coil spring 366 combination. Thus, the adjustment of screw 364 permits fine tuning for the setting of the trip point of brake 210. Finally, stop plate 348 has two upstanding bosses 368 located for properly positioning the withdrawn or retracted pawls 220 and 222.

Brake 210 operates in a manner quite similar to the operation of brake 10 as described hereinabove. As the shaft rotates, centrifugal force acts on pawls 222 and 224 tending to force them radially outwardly, but they are prevented from such movement by the resilient engagement of ball 360 in the pawl depression 362. However, at a predetermined rotational speed, the centrifugal force acting on one or both of pawls 222 and 224 overcomes the restraining force exerted by leaf spring member 358 as adjusted by screw 364 and the corresponding pawl 222 or 224 snaps outwardly such that the trailing edge is prevented from full outward movement by a corresponding cam 236 or 238 and the leading edge thereof engages the corresponding lug 291.

Figure 4:
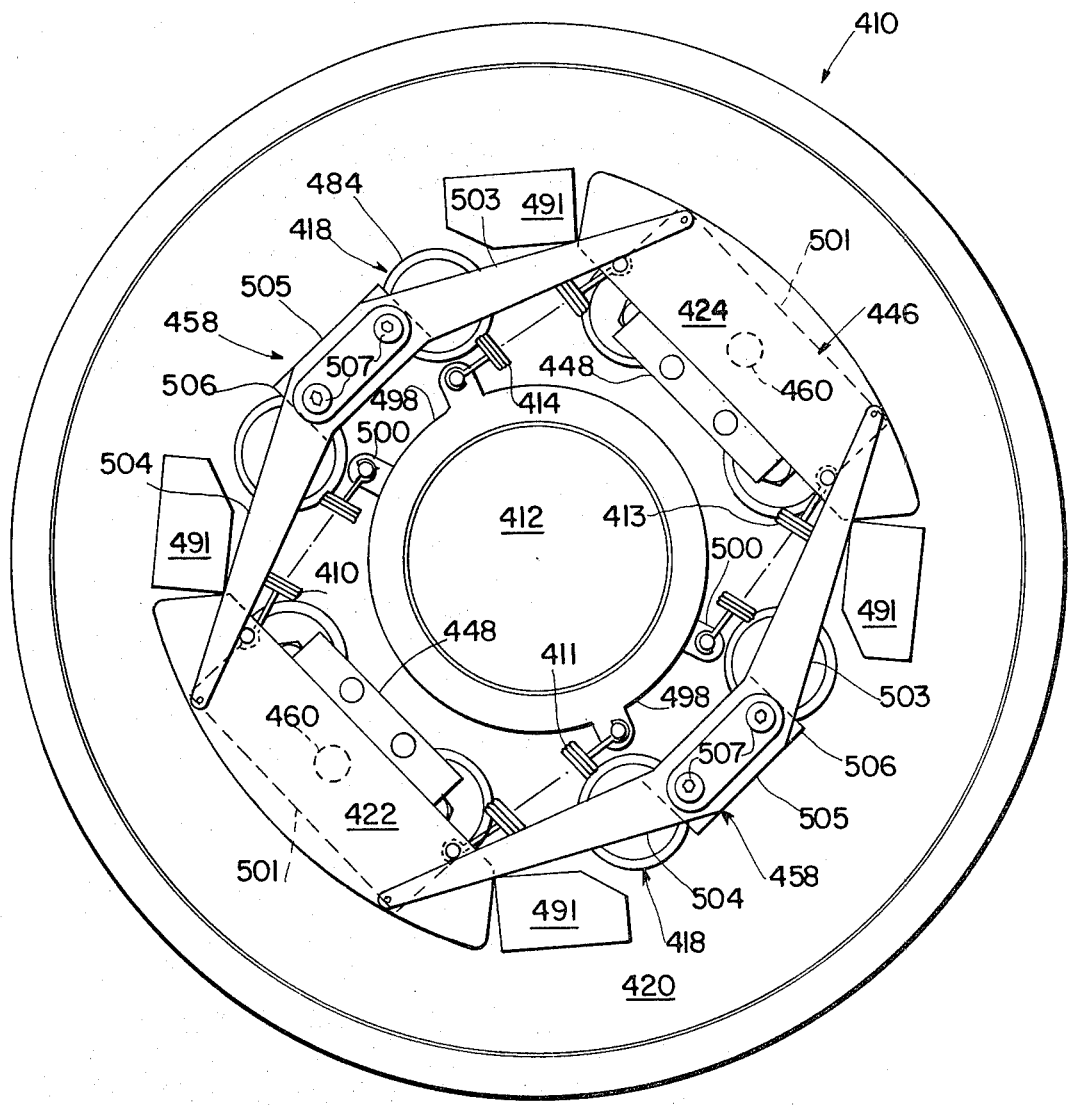
FIG. 4 is a plan view taken from a scaled blueprint of a third embodiment of an overspeed safety brake with the stationary parts removed for clarity.

A third embodiment of an emergency overspeed brake 410 that encorporates many of the features of brakes 10 and 210 is depicted in FIG. 4. As in brake 10, brake 410 utilizes a plurality of brake springs 484 in a multidisc, constant reloaded disc brake means 418 brake 410 also has four lugs 491 integrally cast with an outer drive plate 420. However, instead of using coil springs for brake springs 484 such as are used for brake springs 84 in FIG. 1, brake springs 484 are comprised of a plurality of back-to-back small Belleville springs so that a greater brake loading force can be applied and a shaft subjected to much greater torque can be stopped.

On the other hand, the components which brake 410 have similar to the components of brake 210 of FIG. 3 include a ball-detent prevention means 446, four connecting link springs 411, 412, 413 and 414, a stop plate member 448 for locating pawls 222 and 224 in their normal, retracted position and forward and rearward mounting rings 498 and 500, respectively. However, ball-detent preventing means 446 comprises an adjustable tripping plate 501 which is adjustably mounted so as to vary the force exerted against the corresponding pawl 422 or 424 by ball-detent 460 and instead of being comprised of a single leaf spring 358 per pawl, it is comprised of two leaf springs 458 per pawl contacting the pawl at the ends thereof. In the embodiment depicted in FIG. 4, the leaf spring is comprised of a bifurcated elongate leaf spring 502 having generally oppositely extending legs 503 and 504 and a central portion 505 integral therewith and rigidly mounted to outer drive plate 420 through a spacer 506 with means such as by screws 507. Leaf spring legs 503 of each leaf spring engage pawl 422 such that they are in constant engagement therewith during the full radial movement of pawl 422 and leaf spring legs 504 of each leaf spring 458 engage pawl 424 at each end thereof such that they are in constant engagement therewith during the full radial movement of pawl 424.

The operation of brake 410 is essentially the same as the operation of brake 210 depicted in FIG. 3 and described hereinabove.

Figure 5:
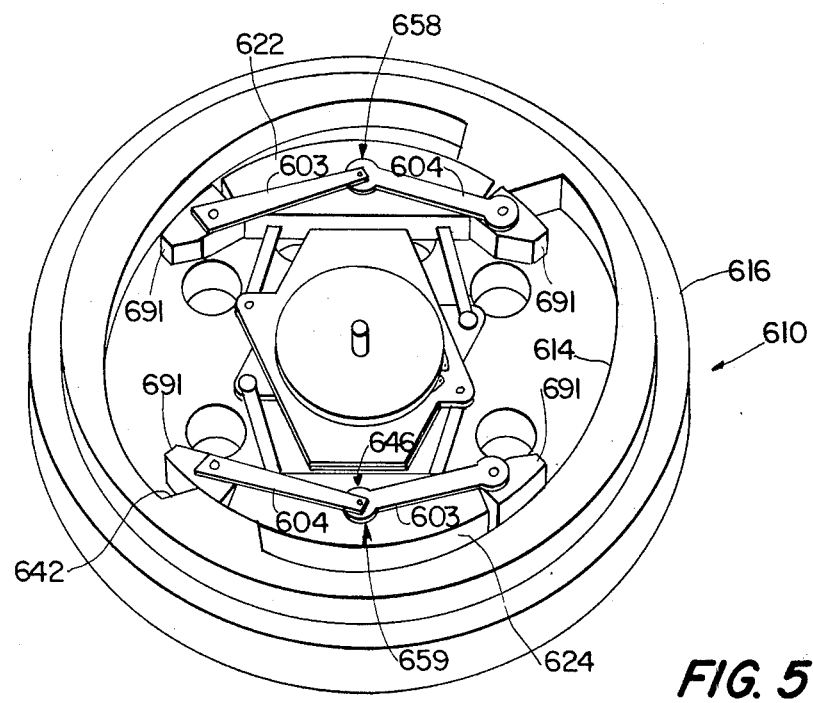
FIG. 5 is a top perspective view taken from a photograph of a modification of the third embodiment of the invention shown in FIG. 4 with the stationary parts removed for clarity and with the brake shown in the disengaged position.
Figure 6:
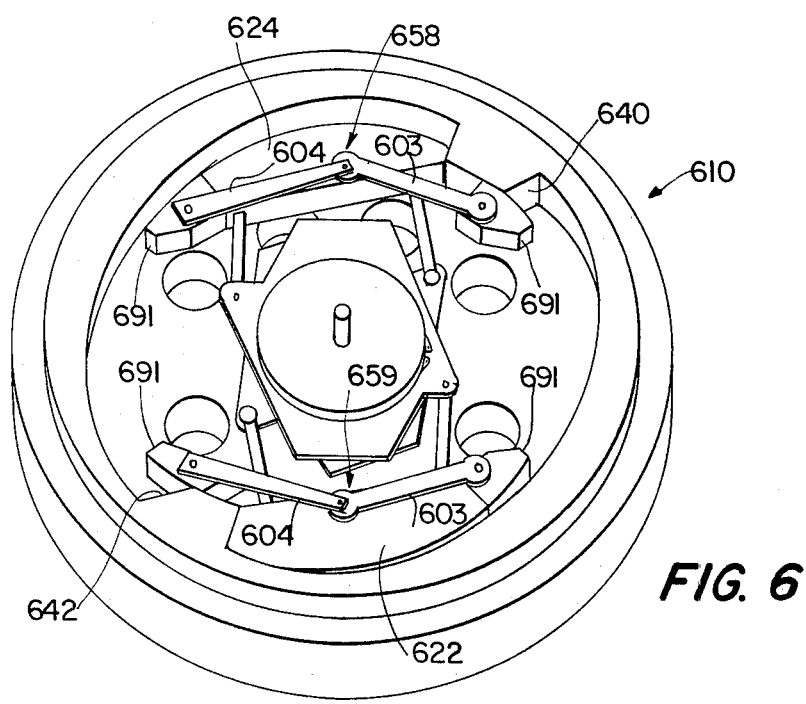
FIG. 6 is a perspective view similar to that of FIG. 5, but with the brake shown in the engaged position.

With reference to FIGS. 5 and 6, a fourth embodiment of an emergency overspeed brake 610 is depicted. Brake 610 is also essentially a hybrid between brakes 10 and 210 of FIGS. 1 and 2 and of FIG. 3, respectively, and is very similar to brake 410 of FIG. 4. Brake 610 is also comprised of a ball-detent prevention means 646 having two leaf springs 658 and 659 engaging pawls 622 and 624. However each leaf spring 658 and 659 only engages the respective pawl 622 and 624. Each leaf spring 658 and 659 is comprised of two arms 603 and 604 which are each pivotally mounted at one end thereof to the top surface of a corresponding lug 691 and are pivotally engaged with each other and a corresponding pawl 622 and 624 at the other ends thereof. Leaf springs 658 and 659 remain engaged with pawls 622 and 624, respectively, during the full radial movement of the pawls.

Brake 610 is depicted in FIG. 5 with pawls 622 and 624 retracted and being retained in that position by prevention means 646. Brake 610 is depicted in FIG. 6 with pawls 622 and 624 in their engaged, braking positions, interposed between stops 640 and 642, respectively, and a corresponding lug 691. As is clearly shown in FIG. 6, the stopping force is transmitted along a straight line through solid components all lying in the same plane and not through any pivot points.

Figure 7:
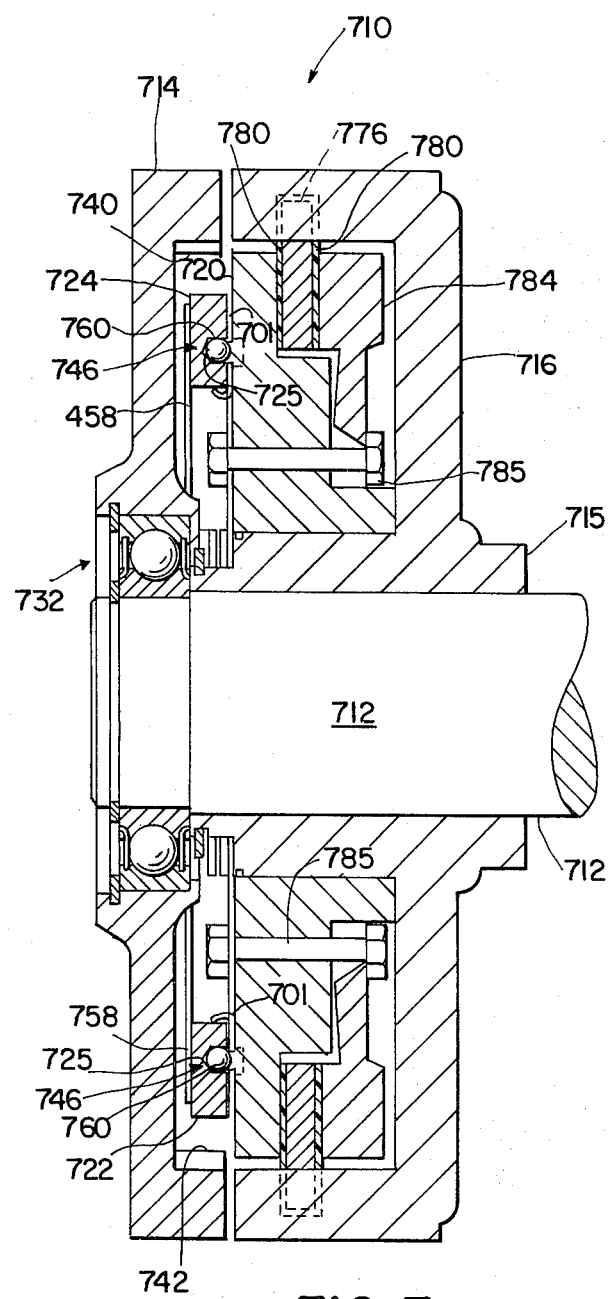
FIG. 7 is a cross-sectional view similar to that of FIG. 2, but a fourth embodiment of the present invention.

A fifth embodiment of an emergency overspeed brake 710 is depicted in FIG. 7. Brake 710 is most similar to brake 210 depicted in FIG. 3 and is a constantly loaded brake having only one brake disk 776 with brake linings 780 and 781 bonded to the forward and rearward sides thereof, respectively. Rearward brake lining 781 engages a single, large Belleville spring 784 rigidly mounted at the inner portion thereof to outer drive plate 720 with a plurality of mounting bolts 725. Forward brake lining 780 engages outer drive plate 720. As in brake 210, pawls 722 and 724 of brake 710 are held in a retracted position by a ball-detent prevention means 746 comprised of a ball 760 located in a hollowed out portion 725 in the rearward side of each pawl 722 and 724, a tripping or adjustment plate 701 used to properly locate the retracted position of detent ball 760, and a leaf spring 758 that is similar to leaf spring 458 depicted in FIG. 4.

Figure 8:
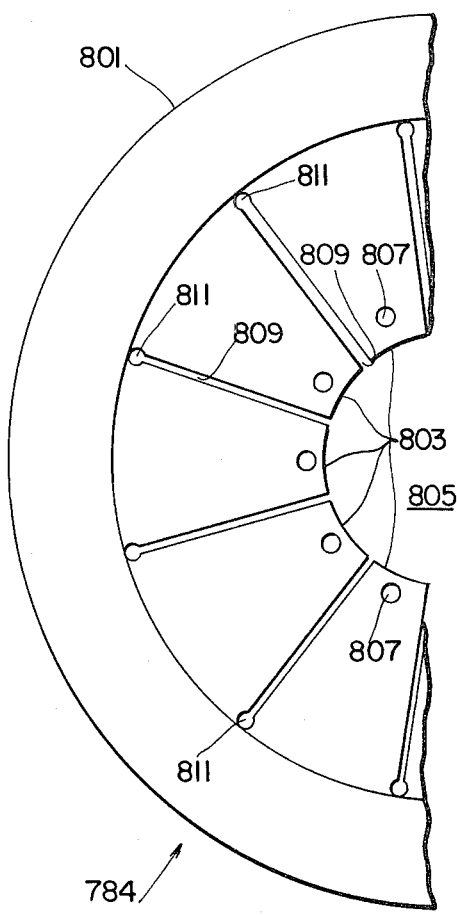
FIG. 8 is a partial plan view of a brake loading spring used in the overspeed brake depicted in FIG. 7.

Belleville spring 784 is shown in greater detail in FIG. 8 and is comprised of a thick solid metal, annular, outer ring portion 801 and a plurality of thinner fingers 803 integrally connected at one end to ring portion 801 and extending radially inwardly. Fingers 803 have a length such that together they define a central orifice 805 in the middle of spring 784 for receiving shaft 712. Each finger 803 has an orifice 807 near the inner terminal end thereof for receiving a corresponding mounting bolt 785. Two adjacent fingers 803 are separated by a narrow channel 809 having an enlarged circular end 811 where fingers 803 join ring portion 801 so as to minimize stress buildup at the junction.

Belleville spring 784 is preferably cast from metal as an integral piece with fingers 803 essentially being co-planar (as shown in dashed lines in FIG. 7). When spring 784 is mounted inside brake 710 and bolts 785 are tightened, fingers 803 form a conical inner section (shown in solid lines in FIG. 7) and together exert a very large force on ring portion 801.

Figure 9:
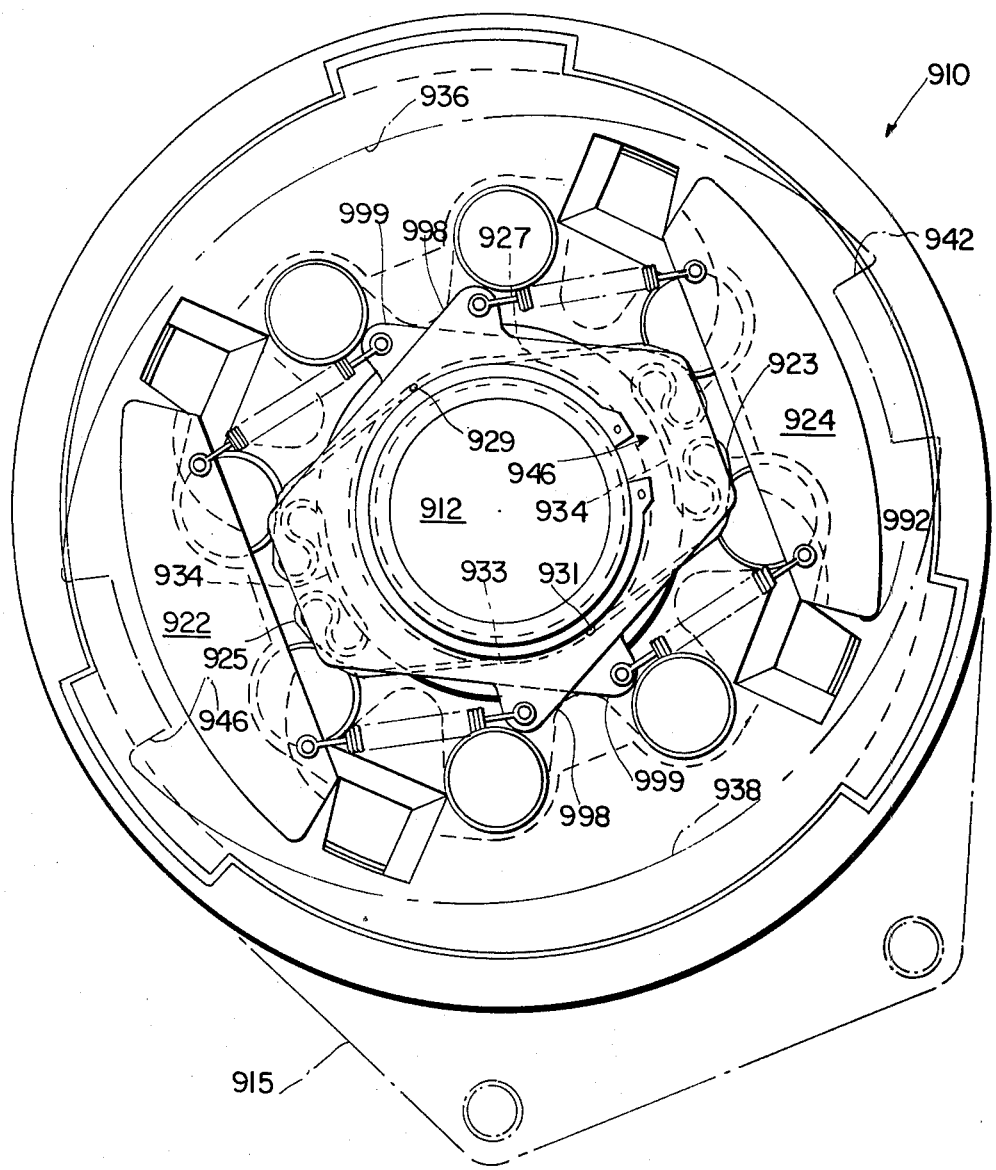
FIG. 9 is a plan view of yet another embodiment of an overspeed safety brake according to the present invention.

Referring finally to FIG. 9, a yet another embodiment of an emergency overspeed brake 910 is depicted. Brake 910 is most similar to brake 10 depicted in FIGS. 1 and 2 because preventing means 946 for preventing outward movement of pawls 922 and 924 until the predetermined rotational shaft velocity has been attained utilizes the over-the-center spring principle of operation. Preventing means 946 comprises two retension springs 923 and 925 fabricated from a length of heavy spring wire. The ends 927 and 129 of springs 923 and 925 are on the same side of shaft 912 and are connected to rearward mounting ring 999 and forward mounting ring 998, respectively. The other ends 931 and 933 of springs 923 and 925 are connected to forward mounting ring 998 and rearward mounting ring 999, respectively. Each spring 923 and 925 has a serpentine central body portion 934 located almost 90 degrees around shaft 912 from the two corresponding spring ends. The design of spring central body portion 934 permits the use of more metal in the spring area and provides greater spring resiliency. Consequently, the system trip point tolerances are reduced.

Assuming clockwise rotation of shaft 912 as shown in FIG. 9, as leading end 992 of pawl 924 moves outwardly in response to centrifugal force, rearward mounting ring 999 rotates counterclockwise (as shown in FIG. 9) and forward mounting ring 998 rotates in the clockwise direction. Thus ends 927 and 931 of retension spring 923 are forced apart against spring pressure and resist the rotation of mounting rings 998 and 999. The over-the-center position is located when ends 927 and 931 are on the fictive diameter of brake 910 which also extends through the center of shaft 912. Upon further outward movement of pawls 922 and 924, ends 927 and 931 of spring 923 will be forced toward one another, thereby assisting the rotation of mounting rings 998 and 997 and hence the outward movement of pawls 922 and 924.

The present invention has been described hereinabove with respect to a plurality of embodiments thereof. Each embodiment, however, provides a bidirectional emergency overspeed brake which operates at very low speeds (about 100 rpm) with a maximum response to angular velocity and a minimum response to angular acceleration as a result of the design of the pawls and the pawl mounting means. The brakes are independent of all hydraulics and electrical controls, operate automatically, and can be easily reset simply by rotating the shaft in the opposite direction. As a result of the geometry of the pawls and their mounting means, both weights move together symmetrically and have a snap-out action at the trip velocity. The bidirectionality of the brake is a result in part of the use of symmetrical cams symmetrically arranged so that the trailing end of the pawl is retained inwardly thereby permitting the leading pawl end to engage the stationary stop protruding in the rotational path.

Although the invention has been described in detail with respect to exemplary embodiments thereof, it will be understood by those of ordinary skill in the art that variations and modifications may be effected within the scope and spirit of the invention.

We claim:

1. A dual action overspeed safety brake for a shaft rotatable in either direction in said brake comprising:
   stop means mountable on a stationary base extending radially inwardly therefrom in the direction of the shaft for providing at least a contact surface for each of the two directions of shaft rotation;
   brake means operatively connectable to the shaft for the braking thereof;
   at least one elongate pawl rotatable when the shaft is rotating and having a leading end and a trailing end, depending upon the direction of shaft rotation;
   restraining means for preventing said pawl trailing end from travelling completely radially outwardly in response to centrifugal force;
   mounting means for mounting said pawl so as to permit outward radial movement of both said pawl ends in response to centrifugal force such that said leading end engages the contact surface corresponding to the direction of rotation and so as to permit said restraining means to prevent the complete outward radial movement of said trailing pawl end; and
   means coupled to said brake means for transmitting the braking force from said engagement of said pawl with said stop means to said brake means, thereby braking the rotation of the shaft.

2. An overspeed safety brake as claimed in claim 1 and further including
   an annular member mountable on a stationary base, said annular member having a central bore through which the shaft can extend and a peripheral flange extending in an axial direction, said stop means being integral with said flange; and
   wherein said restraining means comprises a cam surface located on at least a portion of the radial inner surface of said flange, said mounting means mounting said pawl so as to permit outward radial movement of both ends thereof in response to centrifugal force such that said pawl trailing end can engage said cam surface which thereupon prevents further outward movement of said trailing end.

3. An overspeed safety brake as claimed in claim 2 wherein said cam surface extends radially inwardly at those portions of said flange spaced from said stop and said cam surface curves outwardly at said stop means.

4. An overspeed safety brake as claimed in claim 2 and wherein said stop means comprises two stops spaced on either side of said central bore each stop having two spaced apart, generally radially inwardly extending sides, each side presenting a contact surface for one end of said pawl and said cam surface comprising the inner axially extending wall of two substantially crescent-shaped segments respectively connecting the opposed sides of said two stops.

5. An overspeed safety brake as claimed in claim 4 wherein said stops are symmetrically located on said flange and wherein said stop has, in plan view, a truncated triangle-like shape wherein the radially inward stop end is smaller than the radially outward stop end; and wherein each end of said pawl has a mating shape with the corresponding said segment wall and said stop side.

6. An overspeed safety brake as claimed in claim 1 and further including a hub rigidly mounted on the shaft and rotatable therewith, and an annular drive plate mountable on the shaft spaced from and coaxial with said hub and generally rotatably with said hub;

and wherein said brake means is operatively connected between said hub and said drive plate.

7. An overspeed safety brake as claimed in claim 6 wherein said braking means comprises a disc brake having at least one disc mounted for rigid non-rotatable engagement with said hub, a disc drive plate mounted for rigid non-rotatable engagement with said annular drive plate, brake linings mounted on at least one of said disc and said disc drive plate, and means for resiliently causing axial engagement of said disc and said disc drive plate through said brake linings.

8. An overspeed safety brake as claimed in claim 7 wherein said brake resilient means comprises a spiral spring.

9. An overspeed safety brake as claimed in claim 7 wherein said brake resilient means comprises a compression disc spring that is comprised of a solid annular ring and a plurality of substantially pie-shaped leaves connected at the outer periphery thereof to said annular ring and extending radially inwardly therefrom, and extending in an axial direction therefrom such that a resilient force is generated when said leaves are forced in general coplanar alignment with said annular ring.

10. An overspeed safety brake as claimed in claim 7 wherein said brake resilient means comprises a Belleville disc spring containing orifices for loading bolts, located radially outward close to brake lining, so that the brake lining load and brake torque capacity are increased.

11. An overspeed safety brake as claimed in claim 6 wherein said transmitting means comprises at least one lug integrally mounted on one side of said drive plate, spaced radially inwardly of said stop, and extending axially from said drive plate to an overlapping relationship with said stop such that upon sufficient centrifugal force acting upon said pawl, the entire body of said pawl moves radially outwardly and is interposed between said stop and said lug, thereby causing engagement of said brake means and the application of a braking force to said shaft.

12. An overspeed safety brake as claimed in claim 1 and further comprising an annular member mountable on a stationary base, said annular member having a central bore through which the shaft can extend and a peripheral flange extending in an axial direction; and a second elongate pawl rotatable when the shaft is rotating and having a leading end and a trailing end, depending upon the direction of shaft rotation;

and wherein said stop means comprises two stops spaced directly opposite each other on either side of said central bore, each stop having two spaced apart, generally radially inwardly extending sides, each side presenting a contact surface for one end of said pawl; and said mounting means mounts said pawls directly opposite each other so as to permit outward radial movement of each of said leading pawl ends in response to centrifugal force such that said leading ends engage a corresponding contact surface of said stop means, and mounts said pawls so as to permit said restraining means to prevent the complete outward radial movement of each of said trailing pawl ends.

13. An overspeed safety brake as claimed in claim 12 wherein said restraining means comprises two directly oppositely located cam surfaces on opposite portions of the radially inner surface of said flange.

14. An overspeed safety brake as claimed in claim 13 wherein said cam surfaces define a substantially ovular central orifice and wherein said one stop means comprises a first stop and said further stop means comprises a second stop, said first and second stops being located at the ends of said ovular central orifice and extending inwardly therein.

15. An overspeed safety brake as claimed in claim 12 and further including a hub rigidly mounted on the shaft axially spaced from said annular member and rotatable with said shaft; and an annular drive plate mountable on the shaft in said space between said annular member and said hub and being generally rotatable with said hub;

and wherein said brake means is operatively connected between said hub and said drive plate.

16. An overspeed safety brake as claimed in claim 15 and further comprising means for preventing any substantial outwardly radial movement of said pawls until a predetermined shaft rotational speed is obtained and then for releasing said pawls.

17. An overspeed safety brake as claimed in claim 16 wherein said mounting means is also for coordinating the outward movement of said pawls and for permitting said pawls to move symmetrically together.

18. An overspeed safety brake as claimed in claim 17 wherein said mounting means comprises first and second mounting rings mounted coaxially on said hub for rotation therewith; and first, second, third and fourth linkage means, said first linkage means for connecting said first mounting ring to one end of said one pawl, said second linkage means for connecting said first mounting ring to one end of said second pawl, said third linkage means for connecting said second mounting ring to the other end of said one pawl, and said fourth linkage means for connecting said second mounting ring to the other end of said second pawl.

19. An overspeed safety brake as claimed in claim 18 wherein each said linkage means includes a spring means for resiliently connecting the corresponding mounting ring to the corresponding end of the corresponding pawl.

20. An overspeed safety brake as claimed in claim 19 wherein said preventing means comprises a detent; a detent mounting means for mounting said detent for engagement with said pawl; and adjustable spring means for resiliently releasably engaging said detent with said pawl such that upon a predetermined centrifugal force acting on said pawl, said detent will disengage from said pawl thereby permitting said pawl to move outwardly in response to the centrifugal force and engage said stop.

21. An overspeed safety brake for a rotary shaft rotatable relative to a stationary base comprising a member mountable on the stationary base in proximity of the shaft;

at least one stop integrally mounted to a portion of said member and extending radially inwardly toward the shaft;

a hub integrally mountable on the shaft axially spaced from said member for rotation with the shaft;

a lug operatively connected to said hub;

at least one pawl;

means for mounting said pawl for outwardly radial movement of the entire pawl in response to centrifugal force such that said pawl can move radially outwardly interposed between said stop and said lug and engage said stop and said lug and thereby apply a rotation stopping force that is transmitted from said stop through said pawl to said lug and hence to said hub and the shaft; and means for preventing any outwardly radial movement of said pawl until a predetermined shaft rotational speed is obtained and then for releasing said pawl.

22. An overspeed safety brake as claimed in claim 21 wherein said preventing means comprises a detent; a detent mounting means for mounting said detent for engagement with said pawl; and adjustable spring means for resiliently releasably engaging said detent with said pawl such that upon a predetermined centrifugal force acting on said pawl, said detent will disengage from said pawl thereby permitting said pawl to move outwardly in response to the centrifugal force and engage in said stop.

23. An overspeed safety brake as claimed in claim 22 wherein said detent is a ball; said spring means comprise two leaf spring members, each said spring member fixedly attached at a central portion thereof and resiliently engaging one end of said pawl at one end of said spring member, and wherein said pawl has a recess for receiving said ball.

24. An overspeed safety brake as claimed in claim 22 wherein said brake further comprises braking means operatively connected between said hub and said pawl for the braking of the shaft upon engagement of said pawl with said stop; and wherein said detent comprises a ball and said spring means includes a leaf spring engaging said pawl at a central portion thereof, a further spring and a mounting member resiliently mounting said leaf spring to said braking means.

25. An overspeed safety brake as claimed in claim 21 wherein said mounting means comprises first and second mounting rings mounted for relative rotation about the shaft and connecting means connecting said pawls to said mounting rings;

and wherein said preventing means comprises spring means resiliently opposing relative counter rotational movement of said mounting rings until a predetermined amount of rotation thereof which is the over-the-center position of said spring means, and thereafter aids said counter rotational movement.

26. An overspeed safety brake as claimed in claim 25 wherein said spring means comprises a wire spring having end portions mounted slightly less than on the diameter of the shaft to different ones of said mounting rings, and having a central portion located about ninety degrees from said spring ends, said central portion including a serpentine bend in said wire spring.

27. An overspeed safety brake for a rotary shaft rotatable relative to a stationary base comprising:

a member mountable on the stationary base in proximity of the shaft;

at least one stop integrally mounted to a portion of said member and extending radially inwardly toward the shaft;

a hub integrally mountable on the shaft axially spaced from said member for rotation with the shaft;

at least one lug generally rotatable with the shaft and spaced radially from said stop and extending axially to an overlapping relationship with said stop;

means for operatively connecting said lug to said hub;

at least one pawl angularly spaced from said lug; and means for mounting said pawl for radial movement of at least one end thereof in response to centrifugal force such that said pawl is interposed between said stop and said lug for stopping engagement therewith at a predetermined shaft angular velocity, thereby stopping the rotation of said hub and hence of said shaft.

28. An overspeed safety brake as claimed in claim 27 and further comprising brake means interposed between said hub and said lug connecting means so that the braking of the shaft is accomplished in a gradual manner.

29. An overspeed safety brake for a shaft rotating at relatively low speeds and comprising:

an annular member mountable on a stationary base having a central bore through which the shaft can extend and an annular outer ring concentric and integral with said inner ring;

first and second radially inwardly extending stops integrally mounted on said outer ring spaced apart on either side of said central bore;

a hub having a bore therethrough for being mounted on said shaft for rotation therewith;

first and second yokes mountable on said hub and generally rotatable with the shaft;

at least two lugs operatively connected to said hub and generally rotatable with the shaft;

first and second elongate pawls mounted on opposite sides of said hub bore and having first and second opposing ends;

a first pair of connecting members for connecting said first and second ends of said first pawl to said first and second yokes, respectively, and a second pair of connecting members for connecting said first and second ends of said second pawl to said second and first yokes, respectively, thereby balancing gravity effects when brake is installed with shaft horizontal; and means for releasably retaining said first and second pawls in a radially inward position during the rotation thereof until the centrifugal force reaches a predetermined level, thereupon permitting said pawls to travel radially outwardly in response to the centrifugal force and to be interposed between said stop and said lug in stopping engagement therewith; and thereby stopping the rotation of said hub and hence said shaft.

* * * * *